US006842338B2

(12) United States Patent
Iredale

(10) Patent No.: US 6,842,338 B2
(45) Date of Patent: Jan. 11, 2005

(54) DISPLAY MOUNTING FOR LAPTOP COMPUTER

(76) Inventor: Richard J. Iredale, 17427 Canal Cir., Lake Oswego, OR (US) 97035

( * ) Notice: Subject to any disclaimer, the term of this patent is extended or adjusted under 35 U.S.C. 154(b) by 43 days.

(21) Appl. No.: 10/297,420

(22) PCT Filed: Jun. 5, 2001

(86) PCT No.: PCT/US01/18287
§ 371 (c)(1),
(2), (4) Date: Dec. 5, 2002

(87) PCT Pub. No.: WO01/95076
PCT Pub. Date: Dec. 13, 2001

(65) Prior Publication Data
US 2004/0125549 A1 Jul. 1, 2004

Related U.S. Application Data

(63) Continuation of application No. PCT/US01/18287, filed on Jun. 5, 2001, which is a continuation of application No. 09/859,566, filed on May 16, 2001, now Pat. No. 6,392,877.
(60) Provisional application No. 60/209,657, filed on Jun. 5, 2000.

(51) Int. Cl.[7] ................................................ H05K 7/16
(52) U.S. Cl. ........................ 361/683; 361/740; 292/148; 248/551
(58) Field of Search ................................. 361/679–687, 361/720–727, 740, 759; 364/708.1; 248/551–553; 312/216, 218; 70/57–58, 85; 292/42, 148, 151, 307 R; 708/100

(56) References Cited

U.S. PATENT DOCUMENTS

| 4,859,092 A | 8/1989 | Makita | 400/83 |
| 5,128,662 A | 7/1992 | Failla | 345/1.3 |
| 5,200,913 A | 4/1993 | Hawkins et al. | 361/681 |
| 5,206,790 A | 4/1993 | Thomas et al. | 361/380 |
| 5,224,060 A | 6/1993 | Ma | 364/708 |
| 5,229,920 A | 7/1993 | Spaniol et al. | 361/680 |
| 5,247,285 A | 9/1993 | Yokota et al. | 345/169 |
| 5,255,214 A | 10/1993 | Ma | 364/708.1 |
| 5,278,779 A | 1/1994 | Conway et al. | 361/680 |

(List continued on next page.)

FOREIGN PATENT DOCUMENTS

| EP | 0947909 | 10/1999 |
| JP | 4-267285 | 9/1992 |

OTHER PUBLICATIONS

"ThinkPad TransNote," published on Web site www.ibm.com. Web site visited May 16, 2001 (publication date unknown).

(List continued on next page.)

*Primary Examiner*—Hung Van Duong
(74) *Attorney, Agent, or Firm*—Stoel Rives LLP

(57) ABSTRACT

A laptop computer display module (28) for use in a clamshell type laptop computer includes a telescoping rail assembly (100) that enables the display module (28) to be extended upwardly from a keyboard module (24) of the laptop computer when the display module is rotated to an open position. A computer display panel (28) is rotatably mounted to a display support member (120) of the display module adjacent a top margin of the display panel (70) so that the display panel (70) can be manually swung away from the display support member (120) and toward a user of the laptop computer (20). The invention enables the display panel (70) to be positioned at a comfortable viewing angle without blocking access to the keyboard module (24) for typing and is particularly useful in depth-constrained workspaces such as airplane passenger seats, where the display support member (120) must be positioned at an acute angle relative to the keyboard module (24).

27 Claims, 5 Drawing Sheets

U.S. PATENT DOCUMENTS

| | | | |
|---|---|---|---|
| 5,494,447 A | 2/1996 | Zaidan | 493/31 |
| 5,548,478 A | 8/1996 | Kumar et al. | 361/681 |
| 5,729,429 A | 3/1998 | Margaritis et al. | 361/680 |
| 5,900,848 A | 5/1999 | Haneda et al. | 345/1 |
| 6,005,767 A | 12/1999 | Ku et al. | 361/681 |
| 6,006,243 A | 12/1999 | Karidis | 708/100 |
| 6,008,983 A | 12/1999 | Yen | 361/681 |
| 6,016,171 A | 1/2000 | Tsao | 348/836 |
| 6,031,714 A | 2/2000 | Ma | 361/681 |
| 6,064,373 A | 5/2000 | Ditzik | 345/173 |
| 6,076,786 A | 6/2000 | Meyer | 248/161 |
| D428,863 S | 8/2000 | Rahemtulla et al. | D14/100 |
| 6,128,186 A | 10/2000 | Feierbach | 361/683 |
| 6,151,012 A | 11/2000 | Bullister | 345/168 |
| 6,233,138 B1 * | 5/2001 | Osgood | 361/681 |
| 6,259,597 B1 * | 7/2001 | Anzai et al. | 361/683 |
| 6,262,885 B1 * | 7/2001 | Emma et al. | 361/683 |
| 6,304,431 B1 * | 10/2001 | Kim | 361/680 |
| 6,392,877 B1 * | 5/2002 | Iredale | 361/683 |

OTHER PUBLICATIONS

John Morris, et al., "IBM ThinkPad TransNote," published on Jan. 17, 2001, on Web site http://www.zdnet.com/products/stories/reviews/0,4161,2675423,00.html.

Boeing 777 In–Seat Video Display (date unknown).

International Search Report for PCT Application No. PCT/US01/18287 dated Nov. 2, 2001.

* cited by examiner

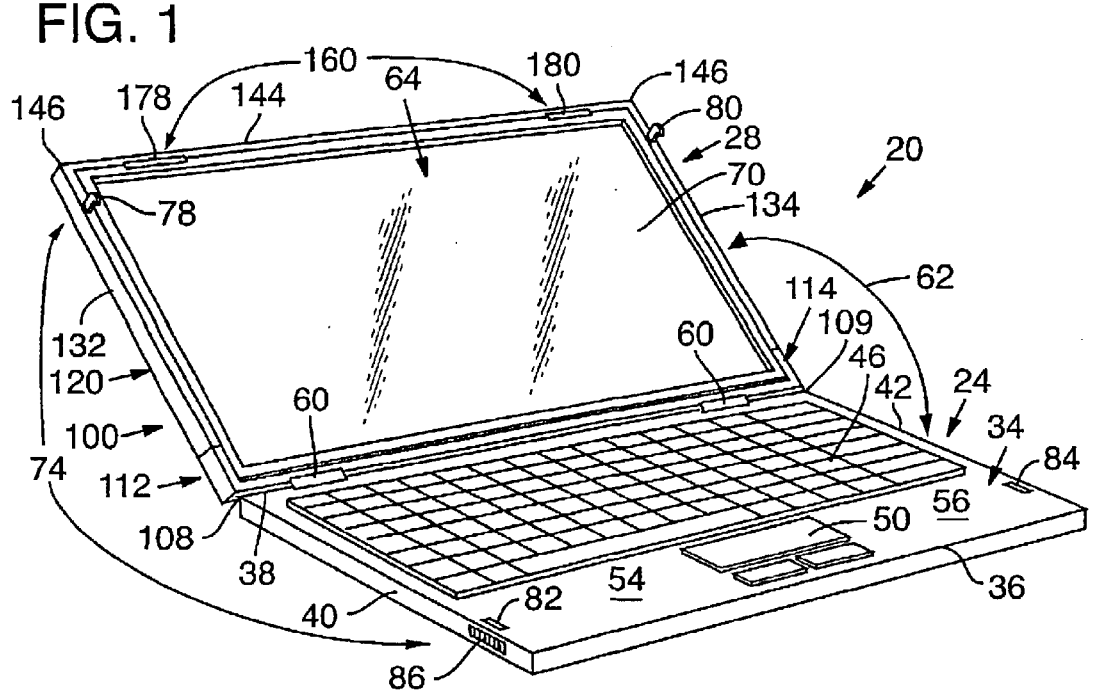
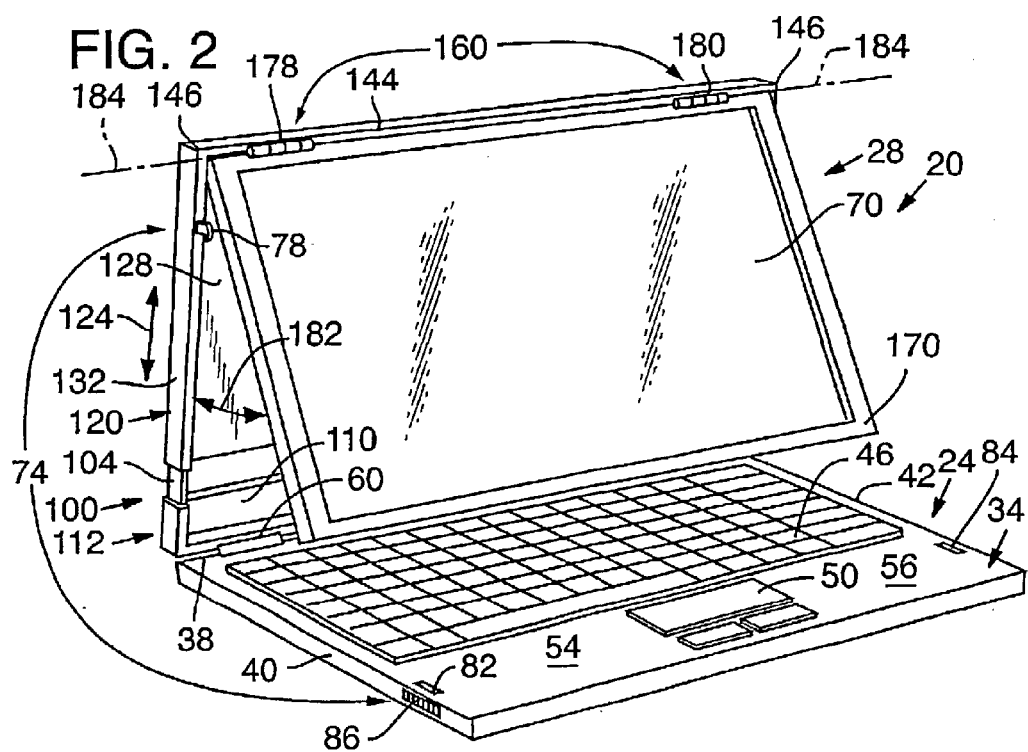

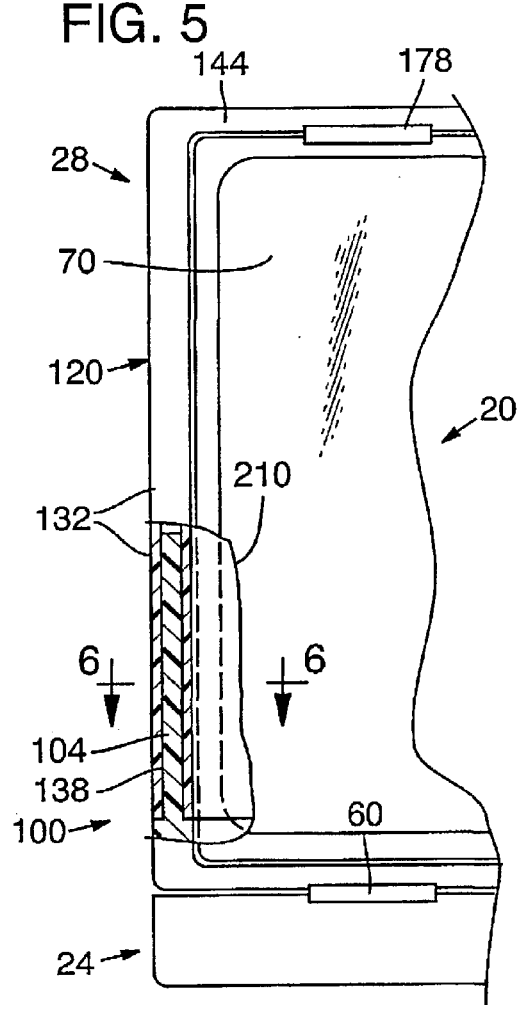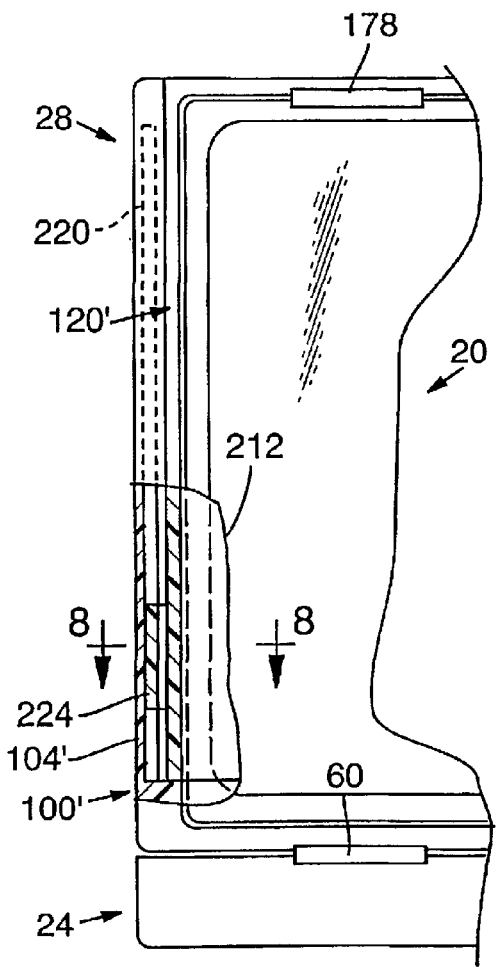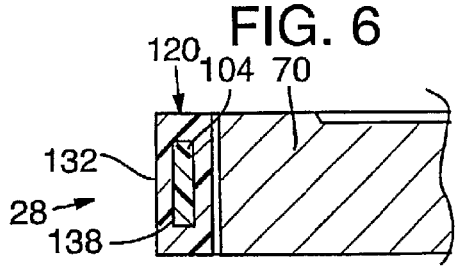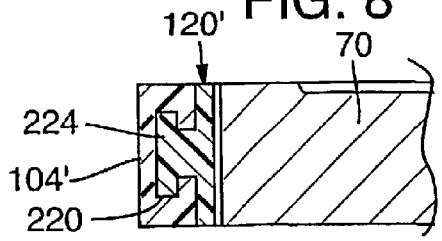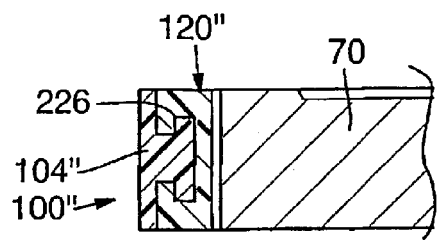

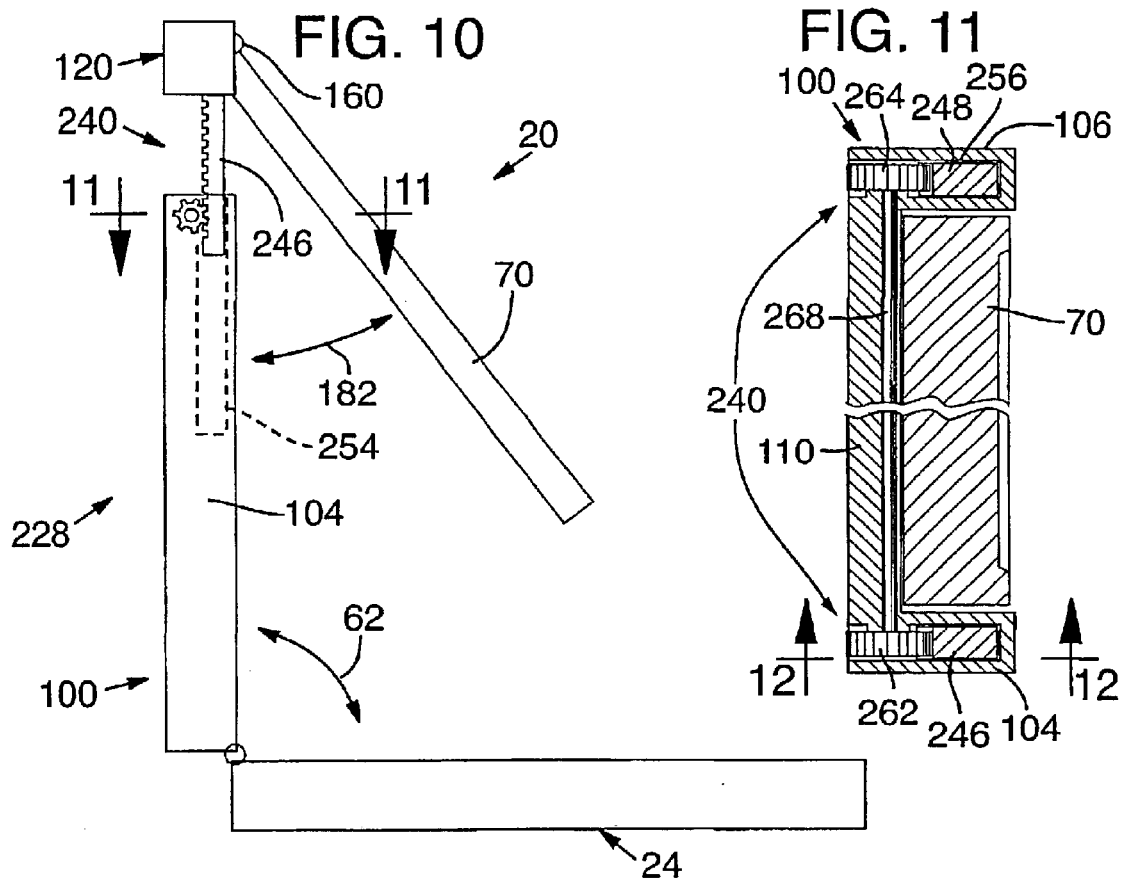
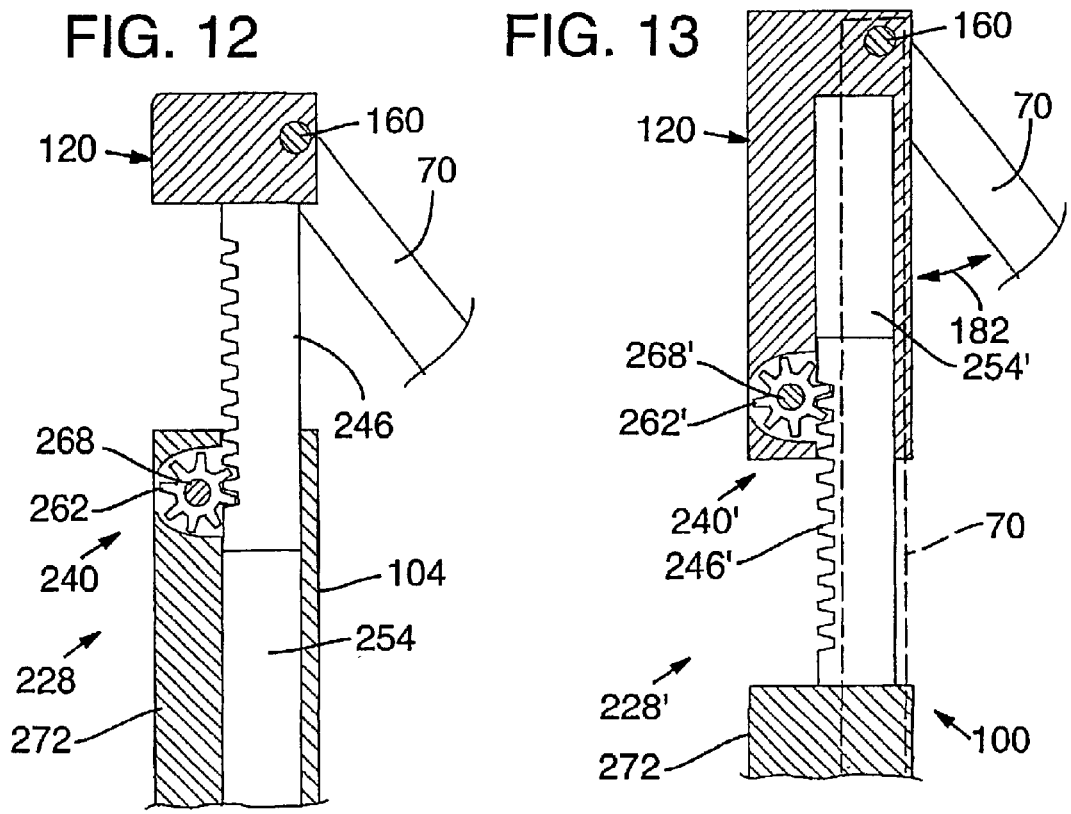

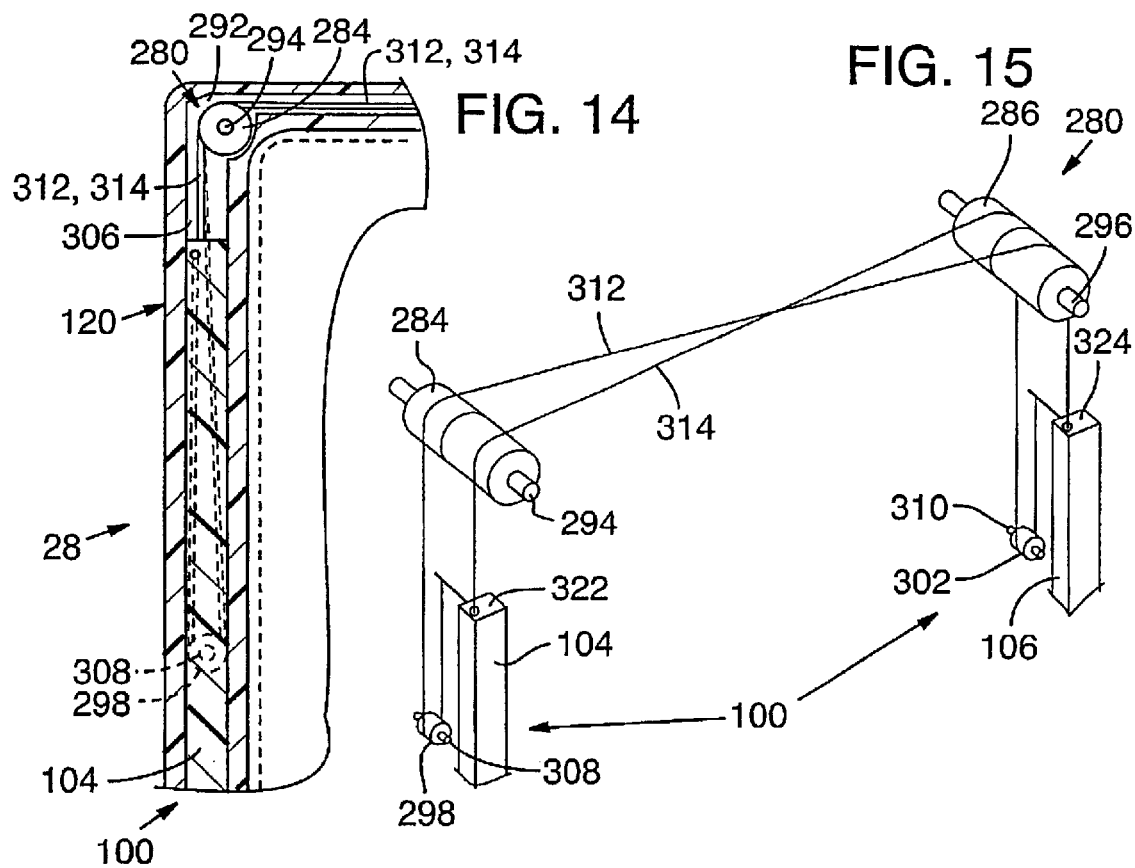
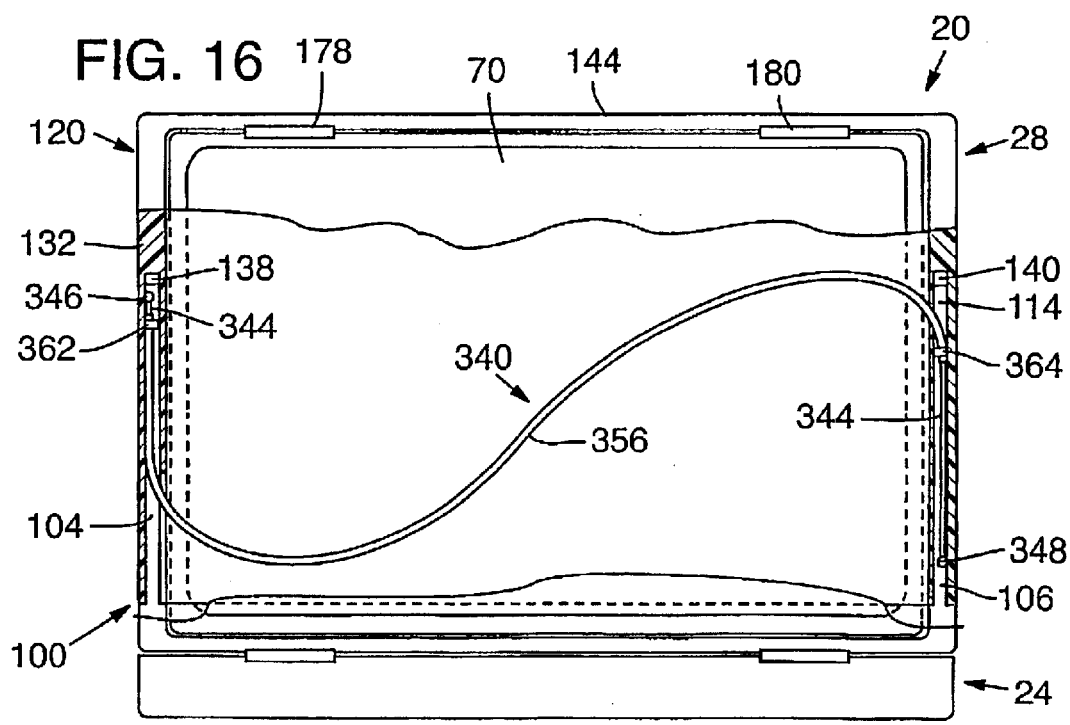

DISPLAY MOUNTING FOR LAPTOP COMPUTER

RELATED APPLICATION

This is a continuation and national phase of International Patent Application No. PCT/US01/18287, filed Jun. 5, 2001, which claims priority from U.S. patent application Ser. No. 09/859,566, filed May 16, 2001, now issued as U.S. Pat. No. 6,392,877 dated May 21, 2002, which claims the benefit under 35 U.S.C. §119(e) of U.S. Provisional Patent Application No. 60/209,657, filed Jun. 5, 2000, all of which are incorporated herein by reference. International Patent Application No. PCT/US01/18287 also claims priority from U.S. Provisional Patent Application No. 60/209,657.

TECHNICAL FIELD

This invention relates to laptop computer display screens and, in particular, to a laptop computer having an improved clamshell type housing that facilitates adjustment of the display screen to a comfortable viewing angle.

BACKGROUND OF THE INVENTION

Conventional clamshell type laptop computers have an upper display unit rotatably connected to a main module that holds a processor unit, a keyboard, a pointing device, data storage devices, and other peripherals. A hinge positioned at a bottom margin of the display unit connects the display unit to the main module near a rear margin of the main module. Rotation of the display unit about the hinge determines the viewing angle of the display. In normal operation, the display unit is typically rotated to an obtuse angle relative to the keyboard. At a comfortable viewing angle, in which the display faces slightly upward, the display unit extends rearward, away from the main module and the hinge. Adjustment of the display unit to the comfortable viewing angle in shallow workspaces, such as passenger seats of commercial airlines, requires the keyboard to be positioned uncomfortably close to the user. Furthermore, when an airline passenger seat immediately in front of the user is reclined, it can be very difficult for the user to view the display. Use in constrained spaces is especially problematic for laptop computer displays utilizing active matrix LCD technology, which is optically directional and has a limited useful viewing angle.

Several proposed laptop computer designs include secondary hinges that allow the display to be rotated to a comfortable viewing angle. For example, U.S. Pat. No. 6,006,243 of Karidis describes a tri-fold laptop computer including a top-hinged display screen that rotates outwardly from an outer display case portion of the housing and into a presentation position. In the presentation position, however, the display screen blocks access to the keyboard of the laptop computer.

U.S. Pat. No. 6,076,786 of Meyer describes a laptop computer having a display adjustment mechanism that is enclosed in a compartment behind a display screen of the laptop computer when the display screen is in a lowered position. The adjustment mechanism is hinged at its bottom end to a rear margin of a keyboard module. Fully extending the display screen above the adjustment mechanism reveals a secondary hinge that allows the display panel to pivot rearward from the secondary hinge and into a more comfortable viewing position. Because the adjustment mechanism is enclosed within the compartment behind the display screen, when lowered, any articulation of the secondary hinge requires the display screen to be fully extended above the adjustment mechanism. This fully extended position is not always desirable, for example, when using the laptop computer on a tall table. Fully extending the display screen also raises the center of gravity of the laptop computer, thereby making it more prone to tipping.

U.S. Pat. No. 6,005,767 of Ku et al., U.S. Pat. No. 5,548,478 of Kumar et al., and U.S. Pat. No. 5,255,214 of Ma all describe laptop computers with displays that are movable to an inclined position for use. All include a laptop computer keyboard that extends up to a front margin of the computer so that no part of the housing is available for use as a wrist rest. The lower section of each of these computers extends several inches rearward of the keyboard to accommodate the display. In an airline passenger seat, this configuration requires the keyboard to be placed several inches closer to the user than would be possible with a conventional laptop computer keyboard. Furthermore, placement of the keyboard at the front margin of the computer does not accommodate a pointing device, such as a touch pad or trackball, in front of the keyboard, as is done in many conventional laptop computers.

Thus, a need exists for an improved display mounting for a laptop computer that facilitates orientation of the display screen at a comfortable viewing angle, even when used in depth-constrained spaces such as airline passenger seats, and without requiring modification to the lower portion of the laptop computer.

SUMMARY OF THE INVENTION

In accordance with the present invention, a computer display module is pivotally connected to a keyboard module of a laptop computer adjacent a rear margin of the keyboard module. The display module includes a rail assembly rotatably connected to the keyboard module at the rear margin and extending outwardly from the rear margin. A display support member of the display module is mounted to the rail assembly for sliding movement along the rail assembly upwardly from the keyboard module when the display module is rotated to an open position. An adjustable display panel of the display module is rotatably mounted to a top portion of the display support member at an articulating joint. The articulating joint is positioned adjacent a top margin of the display panel so that the display panel can be manually swung away from the display support member and toward a user of the laptop computer. The display support member is adjustable along the rail assembly to a height that provides sufficient clearance over the keyboard to allow the display panel to rotate about the articulating joint to a comfortable viewing angle without blocking access to the keyboard.

Laptop computers in accordance with the present invention are particularly useful in depth-constrained spaces such as the tray tables of airline passenger seats, where the display panel can be rotated to the comfortable viewing angle even when the rail assembly and display support member must be positioned at an acute angle relative to the keyboard module. The present invention is also useful in any other environment where the display support member must be positioned at an angle that is more acute than the comfortable viewing angle or where it is desirable to elevate the display to a vertical viewing height above the keyboard module.

In one embodiment, the invention is implemented in a replacement display module for retrofitting a conventional laptop computer.

Additional aspects and advantages of this invention will be apparent from the following detailed description of preferred embodiments thereof, which proceeds with reference to the accompanying drawings.

BRIEF DESCRIPTION OF THE DRAWINGS

FIG. 1 is a perspective view of a laptop computer including a keyboard module and a display module in accordance with a first preferred embodiment of the present invention;

FIG. 2 is a perspective view of the laptop computer of FIG. 1 showing a display support member of the display module rotated to a depth-reduction angle relative to the keyboard module and elevated along a rail assembly to accommodate rotation of a computer display panel of the display module to a comfortable viewing angle;

FIG. 5 is a partial front elevation of the laptop computer of FIG. 1 including a cutaway area showing internal detail of the rail assembly and the display support member;

FIG. 6 is a cross-sectional view of the display module of FIG. 1 taken along line 6—6 of FIG. 5;

FIG. 7 is a partial front elevation of the laptop computer of FIG. 1 including a cutaway area exposing sectional detail of a first alternative rail assembly and display support member;

FIG. 8 is a cross-sectional view of the display module of FIG. 1 taken along line 8—8 of FIG. 7;

FIG. 9 is a cross-sectional view of a left side of a second alternative rail assembly as if taken along line 8—8 of FIG. 7;

FIG. 10 is a left side elevation of a laptop computer including a display module in accordance with a third preferred embodiment of the present invention;

FIG. 11 is a cross-sectional view of the display module of FIG. 10 taken along line 11—11;

FIG. 12 is a cross-sectional view of the display module of FIG. 10 taken along line 12—12 of FIG. 11 showing detail of a rack-and-pinion type anti-skew mechanism;

FIG. 13 is a cross-sectional view of an alternative configuration of the display module and rack-and-pinion anti-skew mechanism of FIG. 12;

FIG. 14 is a partial frontal sectional view of an upper left corner of the display module of FIG. 1. showing an alternative pulley type anti-skew mechanism;

FIG. 15 is a perspective view of the pulley type anti-skew mechanism of FIG. 14 with the display support member and display panel omitted for clarity; and FIG. 16 is a frontal elevation of the laptop computer of FIG. 1 including a cutaway area showing detail of an alternative push rod type anti-skew mechanism.

DETAILED DESCRIPTION OF PREFERRED EMBODIMENTS

Figure 3:
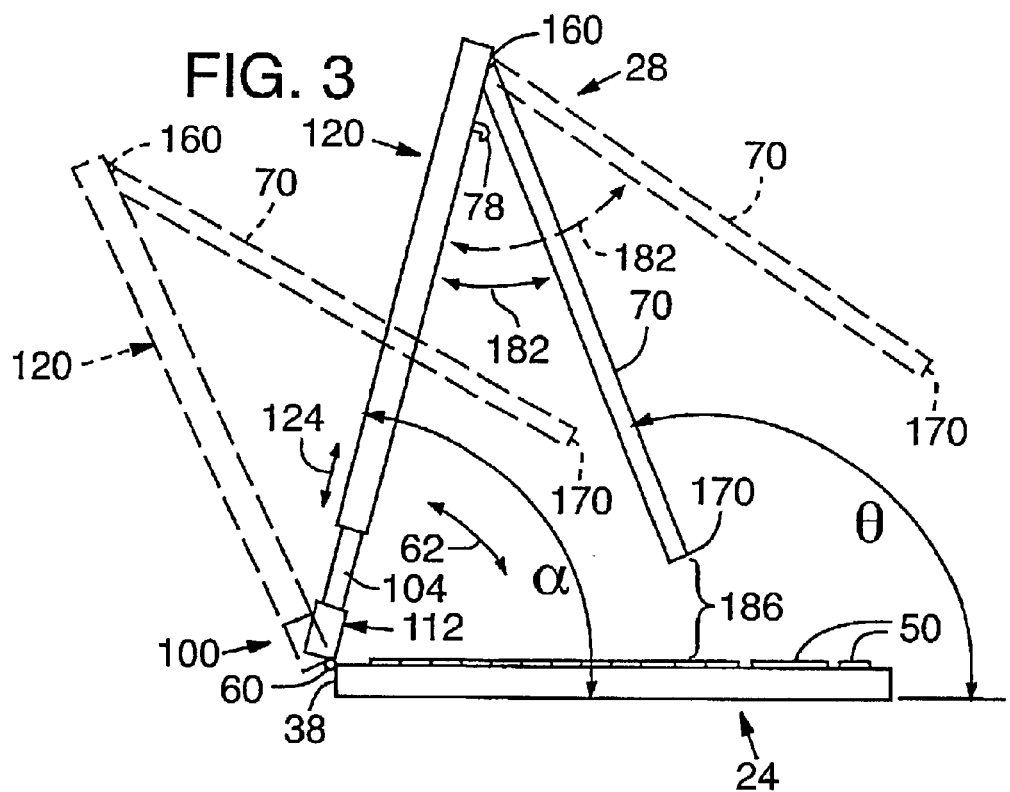
FIG. 3 is a left side elevation of the laptop computer of FIG. 2 showing rotation of the rail assembly and the display support member about a hinge of the display module and showing the computer display panel rotated about an articulating joint to alternate viewing positions.

FIG. 1 is a perspective view of a laptop computer 20 including a keyboard module 24 pivotably connected to a display module 28 in accordance with a first preferred embodiment of the present invention. With reference to FIG. 1, keyboard module 24 is generally tabular in shape and is adapted for placement on a horizontal support surface, such as a user's lap or a table (not shown). Keyboard module 24 includes an upper face 34 bounded by front, rear, left, and right margins 36, 38, 40, and 42, respectively. A keypad 46 is positioned on upper face 34 of keyboard module 24 and adjacent rear margin 38. Keypad 46 may be a QWERTY keyboard of the type used in conventional laptop and notebook computers, or any other kind of keypad, pen tablet, or other manual computer input device. A pointing device 50, such as a touchpad mouse or trackball, for example, is also provided on upper face 34 of keyboard module 24, adjacent keypad 46 and proximal of front margin 36. Pointing device 50 is located medially of left and right margins 40, 42, leaving open a pair of wrist rest areas 54 and 56 on upper face 34 of keyboard module 24.

Display module 28 has a generally tabular shape and is pivotally attached to keyboard module 24 via one or more hinges 60 positioned along rear margin 38 of keyboard module 24 for rotation in the directions indicated by arrows 62. Display module 28 is rotatable between a closed position (not shown) and an open position, as shown in FIG. 1. In the closed position, display module 28 is folded in parallel proximity to keyboard module 24 so that an interior face 64 of display module 28 is positioned over upper face 34 of keyboard module 24 to protect keypad 46 and pointing device 50. In the open position, display module 28 is rotated to an upright or inclined orientation such that interior face 64 is visible to a user of laptop computer 20. In FIG. 1, display module 28 is shown opened to an angle of approximately 120° relative to keyboard module 24 so that a display panel 70 of display module 28 is at a comfortable viewing angle. The comfortable viewing angle will vary among users depending on the height of the user, the vertical position of laptop computer 20 and display module 28, the user's workspace, the user's preferences, and other individual and environmental factors, but will generally fall in the range of approximately 90° to approximately 150° relative to keyboard module 24.

A latching mechanism 74 of laptop computer 20 includes a display-side latching device such as left and right latch hooks 78 and 80, which may be formed as part of a unitary structure with one of the components of display module 28. Corresponding left and right latch slots 82 and 84 are provided in upper face 34 of keyboard module 24 for receiving latch hooks 78 and 80. A spring-biased release mechanism 86 is provided adjacent left and right latch slots 82, 84 for manually releasing latching mechanism 74 to allow display module 28 to be rotated to the open position. Persons skilled in the art will appreciate that latching mechanism 74 is not limited to the hook-and-slot mechanism described herein, and that many other latching devices could be used to releasably secure display module 28 against keyboard module 24 in the closed position.

FIG. 2 is perspective view of laptop computer 20 showing detail of display module 28 arranged for use in a depth-constrained workspace (not shown). With reference to FIG. 2, display module 28 includes a rail assembly 100 pivotably connected to keyboard module 24 at rear margin 38 via hinges 60. In keeping with the present invention, a multi-axis pivot mechanism (not shown) could be used in place of hinges 60 to allow display module 28 and rail assembly 100 to be pivoted left and right relative to keyboard module 24, in addition to rotation between the open and closed positions.

Rail assembly 100 includes first and second elongate rails 104 and 106 (FIGS. 15 and 16), which are spaced apart along rear margin 38 and positioned proximal of respective left and right ends 108 and 109 (FIG. 1) of rear margin 38, adjacent left and right margins 40, 42 of keyboard module 24. A web 110 extends between a left side 112 and a right side 114 (FIG. 1) of rail assembly 100 to stiffen and provide structural support to rail assembly 100.

Display module 28 also includes a display support member 120 mounted to rail assembly 100 for sliding movement along rail assembly 100 upwardly from keyboard module 24 in the direction shown by arrows 124 when display module 28 is pivoted to the open position. Display support member 120 preferably includes a display support cover panel 128 spanning the width of display support member 120 to provide rigidity and structural stability to display support member 120 and to protect delicate electronic components of display panel 70. Display support member 120 also preferably comprises first and second columns 132 and 134, which are spaced apart and include respective first and second slots 138 and 140 (FIGS. 5 and 16). First and second slots 138, 140 are shaped and sized to slidably receive first and second rails 104, 106. Rails 104, 106 and columns 132, 134 may be of any of a variety of shapes or configurations adapted for telescoping movement, some of which are described below. In alternative embodiments, e.g., FIGS. 7–8 and 10–12, the first and second slots are formed in the rail assembly rather than the display support member.

A crossbar 144 extends between distal ends 146 of first and second columns 132, 134 to provide additional rigidity and structural support to display support member 120. Crossbar 144 supports an articulating joint 160, which is positioned adjacent a top margin 164 of display panel 70 to pivotably interconnect a top portion 168 of display panel 70 to crossbar 144. Articulating joint 160 includes left and right friction hinges 178 and 180 that enable a bottom portion 170 of display panel 70 to be manually swung away from display support member 120 in the direction shown by arrows 182, to thereby adjust display panel 70 to a comfortable viewing angle. In alternative embodiments (not shown) articulating joint 160 includes a laterally adjustable joint such as a ball-and-socket joint or vertical hinge that allows display panel 70 to be tilted to the left or right in addition to rotation about a generally horizontal axis 184 defined by friction hinges 178, 180.

With reference to FIG. 3, a comfortable viewing angle is achieved by rotation of display module 28 about hinge 60 and rotation of display panel 70 about articulating joint 160 relative to keyboard module 24 so that display panel 70 is inclined greater than 90° and less than 150° relative to keyboard module 24, as indicated by θ. The present invention accommodates use of laptop computer 20 in a shallow workspace (not shown) by facilitating use of display module 28 when rail assembly 100 and display support member 120 are rotated to a depth-reduction angle α of less than 120° relative to keyboard module 24. Display support member 120 is extended generally vertically along rail assembly 100 to a vertical position sufficient to allow display panel 70 to rotate about articulating joint 160 without striking or blocking keypad 46. Extension of display support member 120 along rail assembly 100 in this manner leaves a gap 186 between bottom portion 170 of display panel 70 and keyboard module 24 that is sufficient to allow a user to type on keypad 46 by reaching under display panel 70. Generally, depth reduction angle α must be greater than 30° to form gap 186 and to accommodate typing on keypad 46. In a preferred embodiment, display support member 120 is movable up to six inches along rail assembly 100, to a more ergonomic viewing height.

Once adjusted upwardly along rail assembly 100, display support member 120 can be held in place by a friction mechanism (not shown) such as a friction fit between rail assembly 100 and display support member 120. A detent mechanism (not shown) could also be used to hold display support member 120 at a user-selected height along rail assembly 100. Friction mechanisms and detent mechanisms are of conventional design and are not illustrated herein because they are easily implemented by one skilled in the art.

Figure 4:
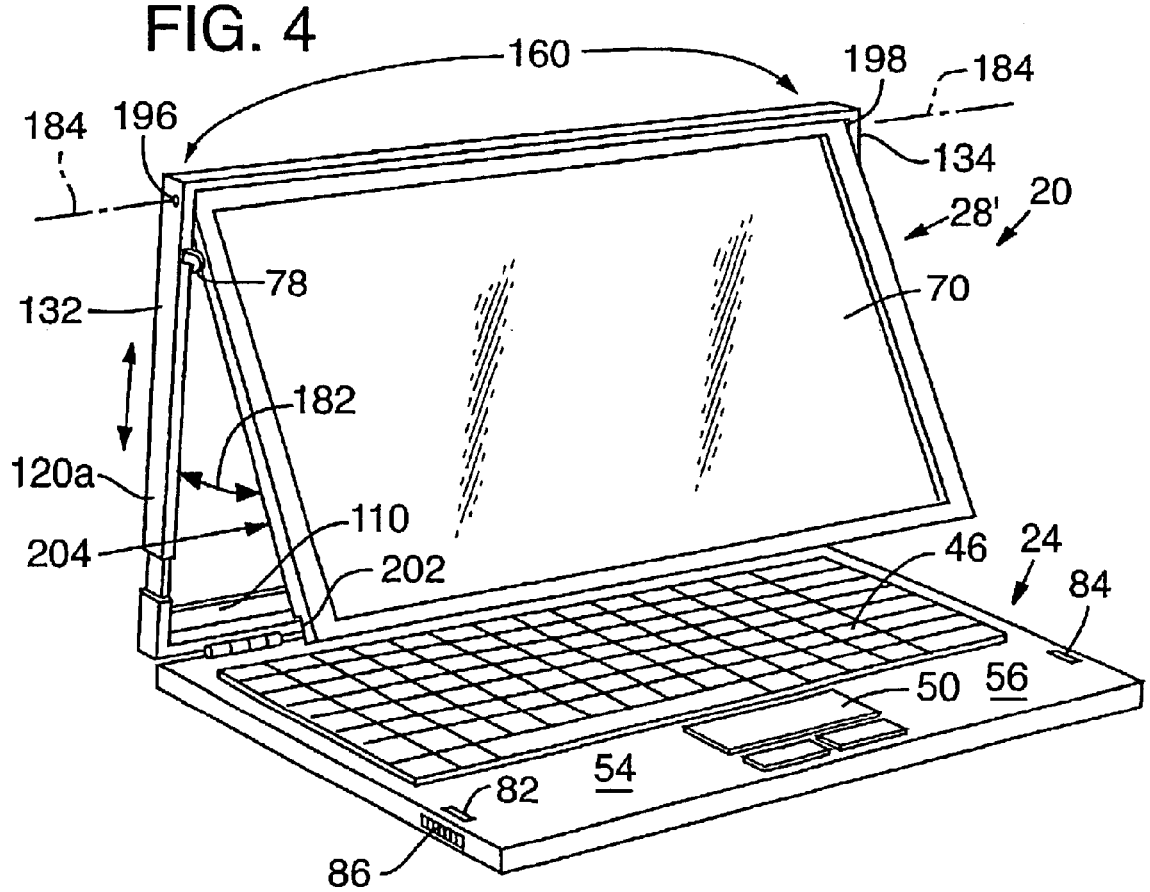
FIG. 4 is a perspective view of a laptop computer including a display module in accordance with a second preferred embodiment of the present invention.

FIG. 4 is a perspective view of laptop computer 20 including a second preferred embodiment display module 28' in accordance with the present invention. With reference to FIG. 4, articulating joint 160 includes left and right pivot points 196 and 198 joining display panel 70 to the first and second columns 132, 134 of display support member 120a for rotation of display panel 70 about axis 184 in the direction shown by arrows 182. Unlike display support member 120 of FIG. 2, display support member 120a of the second preferred embodiment does not include a display support cover panel 128 (FIG. 4), but is open between first and second columns 132, 134. A notch 202 formed along an outer surface 204 of bottom portion 170 of display panel 70 seats against structural support web 110 to thereby form a flush cover surface when display module 28' is in the closed position.

FIG. 5 is a partial front elevation of laptop computer 20 of FIG. 1 including a cutaway area 210 showing internal detail of rail assembly 100 and display support member 120. FIG. 6 is a cross-sectional view of display module 28 taken along line 6—6 of FIG. 5. With reference to FIGS. 5 and 6, first elongate rail 104 of rail assembly 100 is slidably received in first slot 138 of first column 132.

FIG. 7 is a partial front elevation of laptop computer 20 of FIG. 1 including cutaway area 212 exposing sectional detail of a first alternative rail assembly 100' and display support member 120'. FIG. 8 is a cross-sectional view of display module 28 taken along line 8—8 of FIG. 7. With reference to FIGS. 7 and 8, first elongate rail 104' of rail assembly 100' includes a C-channel section 220 sized and shaped to slidably receive a T-shaped tab 224 of display support member 120'.

FIG. 9 is a cross-sectional view of a second alternative rail assembly 100" corresponding to a sectional view taken along line 8—8 of FIG. 7. With reference to FIG. 9, rail assembly 100" includes a T-shaped first elongate rail 104" slidably seated within a C-channel slot 226 of display support member 120". FIGS. 5–9 are presented for the purpose of illustrating several simple alternatives for rail assembly 100 and display support member 120, and should not be construed as limiting the scope of the invention. One skilled in the art will appreciate that rail assembly 100 and display support member 120 could easily be made in different telescoping forms such as, for example, a single rail and support column spanning the entire width of display module 28.

FIG. 10 is a left side elevation of laptop computer 20 including a display module 228 in accordance with a third preferred embodiment of the present invention. FIG. 11 is a cross-sectional view of display module 228 taken along line 11—11 of FIG. 10. FIG. 12 is a cross-sectional view of display module 228 taken along line 12—12 of FIG. 11. With reference to FIGS. 10–12, display module 228 includes an anti-skew mechanism 240 that mechanically couples movement of display support member 120 along first rail 104 to movement of display support member 120 along second rail 106. Anti-skew mechanism 240 is a rack-and-pinion type mechanism including left and right racks 246 and 248, spaced apart along display support member 120 and extending from display support member 120 in a generally parallel relationship. Left and right racks 246, 248 are received in respective left and right guide slots 254 and 256 of rail assembly 100 and engage with respective left and right pinion gears 262 and 264. An axle 268 rigidly connects left pinion gear 262 to right pinion gear 264 so that pinion gears 262, 264 rotate in unison. Display panel 70 is rotatably mounted to display support member 120 via articulating joint 160 in the manner described above with reference to FIG. 2.

FIG. 13 is a cross-sectional view of an alternative configuration of display module 228 and rack-and-pinion anti-skew mechanism 240 of FIGS. 10–12 (indicated in FIG. 13 as 228' and 240', respectively). With reference to FIG. 13, a left rack 246' is rigidly attached to a base portion 272 of rail assembly 100 and extends upwardly from base portion 272. Left rack 246' is received in a left guide slot 254' formed in display support member 120. A pinion gear 262' of anti-skew mechanism 240' is rotatably mounted within display support member 120 on an axle 268' for operative engagement with left rack 246'. A right pinion gear engages a right rack (not shown) and is rigidly connected to axle 268' for rotation in unison with left pinion gear 262', to thereby prevent skew of display module 228'.

Many other anti-skew mechanisms can be employed in place of rack-and-pinion anti-skew mechanisms 240 and 240'. Examples of two additional anti-skew mechanisms are shown in FIGS. 14–16. FIG. 14 is a partial frontal sectional view of an upper left corner of display module 28 of FIG. 1, showing detail of a pulley type anti-skew mechanism 280. FIG. 15 is a perspective view of pulley type anti-skew mechanism 280 of FIG. 14, with display support member 120 and display panel 70 omitted for clarity. With reference to FIGS. 14 and 15, anti-skew mechanism 280 includes left and right major idler pulleys 284 and 286 positioned within a cavity 292 of display support member 120. Major idler pulleys 284, 286 are rotatably mounted to display support member 120 for rotation about respective left and right major shafts 294 and 296. Left and right major idler pulleys 284 and 286 remain distal of first and second elongate rails 104, 106 throughout the range of movement of display support member 120 along rail assembly 100. A pair of left and right minor idler pulleys 298 and 302 are mounted within respective left and right guide slots 306 (only left guide slot is shown) of display support member 120 for rotation about respective left and right minor shafts 308 and 310, which are mounted parallel to major shafts 294, 296 of major idler pulleys 284, 286. Left and right minor idler pulleys 298 and 302 are attached to display support member 120 at a location medial of the keyboard module 24 (FIG. 1) and the distal ends 322, 324 of first and second elongate rails 104, 106 for cooperative pulley action with left and right major idler pulleys 284, 286. A pair of cables 312 and 314 extend between distal ends 322 and 324 of respective first and second rails 104, 106 and are wound about pulleys 284, 286, 298, and 302 in the manner shown in FIG. 15 to prevent skew of display support member 120 as it is moved along rail assembly 100.

FIG. 16 is a frontal elevation of laptop computer 20 of FIG. 1 including a cutaway area showing detail of a push-rod type anti-skew mechanism 340 in accordance with yet another alternative embodiment of the present invention. With reference to FIG. 16, anti-skew mechanism 340 includes a flexible push rod cable 344 having a first end 346 that is securely attached to first column 132 of display support member 120 within first slot 138. Push rod cable 344 terminates in a second end 348, which is securely attached to second column 134 of display support member 120 near a proximal end of second slot 140 located medially of right side 114 of rail assembly 100. Push rod cable 344 extends through a push rod sleeve 356, which is rigidly attached at its first and second ends 362 and 364 to respective first and second rails 104 and 106. Push rod type anti-skew mechanism 340 is arranged and mounted so that push rod cable 344 extends from first end 362 of push rod sleeve 356 by the same amount that it slides into second end 364 of push rod sleeve 356 when display module 28 is moved along rail assembly 100, to thereby prevent skew of display module 28.

In still another embodiment of the invention, a motorized height adjustment mechanism (not shown) is provided for driving display support member 120 along rail assembly 100. For example, with reference to FIGS. 10–13, the motorized height adjustment mechanism could include a small electric motor directly or indirectly mechanically coupled to left and right pinion gears 262, 264 (or axle 268 of rack-and-pinion anti-skew mechanism 240. The electric motor would rotate pinion gears 262, 264 when activated by the user, thereby driving display support member 120 along rail assembly 100 to a selected height. A similar motorized height adjustment mechanism could also be easily implemented with the pulley type anti-skew mechanism of FIGS. 14 and 15. In this configuration, geared pulleys and toothed belts could be used in place of major idler pulleys 284, 286 and cables 312, 314 to transmit drive force from the electric motor to the display support member 120.

Although not shown in the figures, a display cable is typically employed to operably connect display panel 70 to keyboard module 24 for communication of display data or signals to display panel 70. Various pathways and devices are known for routing the display cable and could easily be used with the present invention. Other methods of transmitting display information between keyboard module 24 and display panel 70 that do not involve a display cable could also be utilized. For example, wireless transmitters and receivers such as infrared or radio frequency transceivers could be used in conjunction with the present invention.

In accordance with the present invention, the display module of FIGS. 1–16 is designed for use with a laptop computer or notebook computer. However, the present invention can also be used with any other kind of computing device or visual display device and is especially useful with such devices including a lower input module and a hinged upper display module having a flat display panel. While the invention is described above in the context of a laptop computer, it could also be embodied in a replacement display module manufactured separately from the keyboard module for after-market retrofitting of a conventional laptop or notebook computer.

It will be obvious to those having skill in the art that many changes may be made to the details of the above-described embodiments of this invention without departing from the underlying principles thereof. The scope of the present invention should, therefore, be determined only by the following claims.

What is claimed is:

1. A laptop computer, comprising:
    a base unit having a generally tabular shape adapted for placement on a support surface, the base unit including a manual input device; and a display module rotatably connected to the base unit, the display module being openable and closeable by rotation of the display module relative to the base unit, the display module including:
(a) a rail assembly,
(b) a display support member mounted to the rail assembly for movement outwardly from the base unit, and
(c) a display panel bordered by a top margin and a bottom margin, the display panel supported on the display support member for rotation of the display panel so that the bottom margin of display panel can be manually swung away from the display support member toward a user of the laptop computer after opening of the display module.

2. The laptop computer of claim 1 in which the display support member is movable along the rail assembly to a height above the base unit that is sufficient to allow the display panel to rotate to a comfortable viewing angle without blocking the manual input device of the base unit and to thereby allow a user to comfortably view the display panel while manually inputting data via the manual input device when using the laptop computer in a depth-constrained workspace.

3. The laptop computer of claim 1, further comprising an articulating joint connecting the display panel to the display support member, and in which the articulating joint includes a torque joint that adjustably maintains an angular position of the display panel relative to the display support member.

4. The laptop computer of claim 1 in which:
the rail assembly includes first and second rails spaced apart in parallel relation; and
the display support member includes a first slot and a second slot spaced apart from the first slot, the first and second slots sized and positioned to receive the first and second rails, respectively.

5. The laptop computer of claim 1 in which:
the rail assembly includes a first rail and a second rail, the first and second rails spaced apart in parallel relation and rigidly attached to the display support member; and
the rail assembly further includes first and second slots spaced apart in parallel relation, the first and second slots sized and positioned to receive the first and second rails, respectively.

6. The laptop computer of claim 1 in which the display module includes an articulating joint that rotatably interconnects the top margin of the display panel to the display support member.

7. The laptop computer of claim 1 in which:
the base unit includes a rear margin; and
the display module is rotatably connected to the base unit along the rear margin.

8. The laptop computer of claim 1 in which the manual input device includes a keypad.

9. The laptop computer of claim 1 in which the manual input device includes a pen tablet.

10. The laptop computer of claim 1 in which the manual input device includes a pointing device.

11. The laptop computer of claim 1, further comprising a latching device for releasably latching the display module to the base unit and preventing movement of the display support member along the rail assembly when the display module is closed.

12. The laptop computer of claim 2 in which the display panel is manually rotatable to the comfortable viewing angle without blocking the manual input device when the display support member is rotated to a depth-reduction angle of greater than 30 degrees and less than 120 degrees relative to the base unit.

13. The laptop computer of claim 4, further comprising an anti-skew mechanism that mechanically couples movement of the display support member along the first rail to movement of the display support member along the second rail, thereby preventing binding of the display support member and the rail assembly.

14. The laptop computer of claim 5, further comprising an anti-skew mechanism that mechanically couples movement of the first rail within the first slot to movement of the second rail within the second slot, thereby preventing binding of the display support member and the rail assembly.

15. The laptop computer of claim 12 in which the comfortable viewing angle is greater than 90 degrees and less than 150 degrees relative to the base unit.

16. A laptop computer display module, comprising:
a rail assembly including a hinge end adapted to be rotatably mounted to a base unit of a laptop computer so that the rail assembly extends outwardly from the base unit and so that the display module can be opened and closed by rotating the display module about the hinge end, the display module rotatable to a closed position in which the display module is folded against the base unit and an open position in which the display module extends from the base unit;
a display support member attached to the rail assembly for movement away from the hinge end of the rail assembly when the display module is opened;
a computer display panel having top and bottom margins; and
an articulating joint connecting the computer display panel to the display support member adjacent the top margin of the computer display panel so that the bottom margin of the computer display panel can be manually swung away from the display support member and toward a user of the laptop computer when the display module is mounted to the base unit and opened.

17. The laptop computer display module of claim 16 in which the display support member is movable away from the hinge end of the rail assembly a distance sufficient to allow the computer display panel to rotate about the articulating joint to a comfortable viewing angle when the display module is installed on a base unit, without interfering with manual operation of a manual input device of the base unit, and to thereby allow a user to comfortably view the display panel while manually operating the manual input device in a depth-constrained workspace.

18. The laptop computer display module of claim 16 in which the comfortable viewing angle is greater than 90 degrees and less than 150 degrees relative to the base unit.

19. The laptop computer display module of claim 16 in which:
the base unit is bordered by a rear margin that terminates in left and right ends;
the rail assembly includes first and second elongate rails spaced apart and rotatably mountable to the base unit proximal of the respective left and right ends of the rear margin; and
the display support member includes a first slot and a second slot spaced apart from the first slot, the first and second slots sized to receive the first and second rails, respectively.

20. The laptop computer of claim 16 in which:
the rail assembly includes a first rail and a second rail, the first and second rails spaced apart in parallel relation and rigidly attached to the display support member; and the rail assembly further includes first and second slots spaced apart in parallel relation, the first and second slots sized and positioned to receive the first and second rails, respectively.

21. The laptop computer display module of claim 16, further comprising a latching device for releasably latching the display module to the base unit and preventing movement of the display support member along the rail assembly when the display module is closed.

22. The laptop computer display module of claim 17 in which the computer display panel is manually rotatable to the comfortable viewing angle without blocking the manual input device when the display support member is rotated to a depth-reduction angle of greater than 30 degrees and less than 120 degrees relative to the base unit.

23. The laptop computer display module of claim 19, further comprising an anti-skew mechanism that mechanically couples movement of the display support member along the first rail to movement of the display support member along the second rail, thereby preventing binding of the display support member and the rail assembly.

24. The laptop computer of claim 20, further comprising an anti-skew mechanism that mechanically couples movement of the first rail within the first slot to movement of the second rail within the second slot, thereby preventing binding of the display support member and the rail assembly.

25. The laptop computer display module of claim 23 in which the anti-skew mechanism includes a push rod extending through an elongate push rod sleeve, and one of the push rod and the push rod sleeve is attached to the display support member and the other of the push rod and the push rod sleeve is attached to the respective first and second rails.

26. The laptop computer display module of claim 23 in which the anti-skew mechanism includes a set of pulleys mounted to the display support member and a cable having first and second ends, the first and second ends of the cable being attached to the respective first and second rails, and the cable being tensioned over the pulleys.

27. The laptop computer display module of claim 24 in which the anti-skew mechanism includes a rack-and-pinion mechanism.

* * * * *